United States Patent
Knighton

(10) Patent No.: US 6,519,905 B1
(45) Date of Patent: Feb. 18, 2003

(54) REVERSIBLE ROOFING PANEL AND METHOD FOR MAKING A ROOFING PANEL

(76) Inventor: Ronald S. W. Knighton, 616 N. Golden Ave., Fullerton, CA (US) 96832

( * ) Notice: Subject to any disclaimer, the term of this patent is extended or adjusted under 35 U.S.C. 154(b) by 0 days.

(21) Appl. No.: 09/341,965

(22) PCT Filed: Jan. 21, 1998

(86) PCT No.: PCT/US98/01161

§ 371 (c)(1),
(2), (4) Date: Jul. 20, 1999

(87) PCT Pub. No.: WO98/31893

PCT Pub. Date: Jul. 23, 1998

Related U.S. Application Data

(60) Provisional application No. 60/038,515, filed on Jan. 21, 1997.

(51) Int. Cl.[7] .................................................. E04B 1/16
(52) U.S. Cl. ........................... 52/378; 52/538; 52/311; 52/537; 52/553; 52/302; 52/533; 52/215; 52/630; 108/10; 427/10; 427/202; 428/142; 428/150
(58) Field of Search ..................... 52/535, 536, 537, 52/538, 539, 630, 745.19, 748.1, 748.11; 156/279, 281; 427/186, 204, 299, 508, 553

(56) References Cited

U.S. PATENT DOCUMENTS

| | | |
|---|---|---|
| 650,939 A | 6/1900 | Kasch |
| 1,657,271 A | 1/1928 | Nelson |
| 2,037,297 A | 4/1936 | Yeager |
| 3,220,150 A | 11/1965 | Besse |
| 4,099,359 A | 7/1978 | Sivachenko ............... 52/630 |
| 4,460,635 A | 7/1984 | Jones et al. |
| 4,478,869 A | 10/1984 | Brady et al. |
| 4,567,084 A | 1/1986 | Jse |
| 4,577,444 A | 3/1986 | Sanderson ............... 52/311 |
| 4,580,384 A | 4/1986 | Hutcheson |
| 4,754,589 A | 7/1988 | Leth |
| 4,774,106 A | 9/1988 | Kozono |
| 5,090,173 A | 2/1992 | Coggan et al. |
| 5,094,058 A | 3/1992 | Slocum |
| 5,174,092 A | 12/1992 | Naden |
| 5,468,542 A | 11/1995 | Crouch |

*Primary Examiner*—Carl D. Friedman
*Assistant Examiner*—Steve Varner
(74) *Attorney, Agent, or Firm*—Lyon & Lyon LLP

(57) ABSTRACT

A roofing system (10) adapted to be supported on a support surface (18), the system including a plurality of panels (14) arranged in partially overlapping relation to form a roof, the panels each having first (42) and second (44) side edges, an upper (26) and lower (30) surfaces providing a series of barrels (46) and pans (50), a first side region (83) defining a portion of a barrel and a first cylindrical mating surface (82), and a second-side region (66) defining a portion of a pan and a second cylindrical mating surface, the panels being arranged in overlapping relation so that the first and second mating surfaces are sealingly engaged.

28 Claims, 3 Drawing Sheets

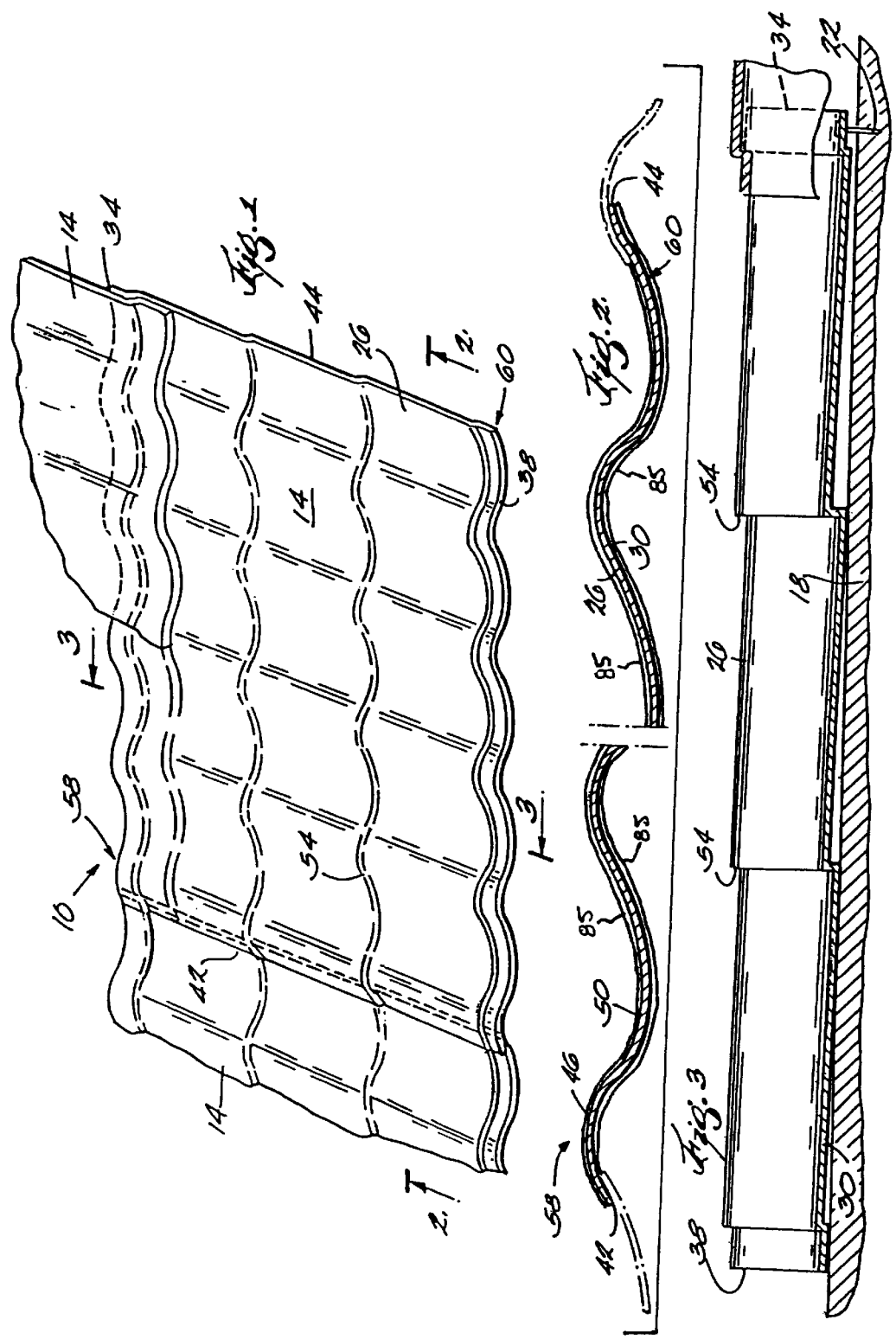

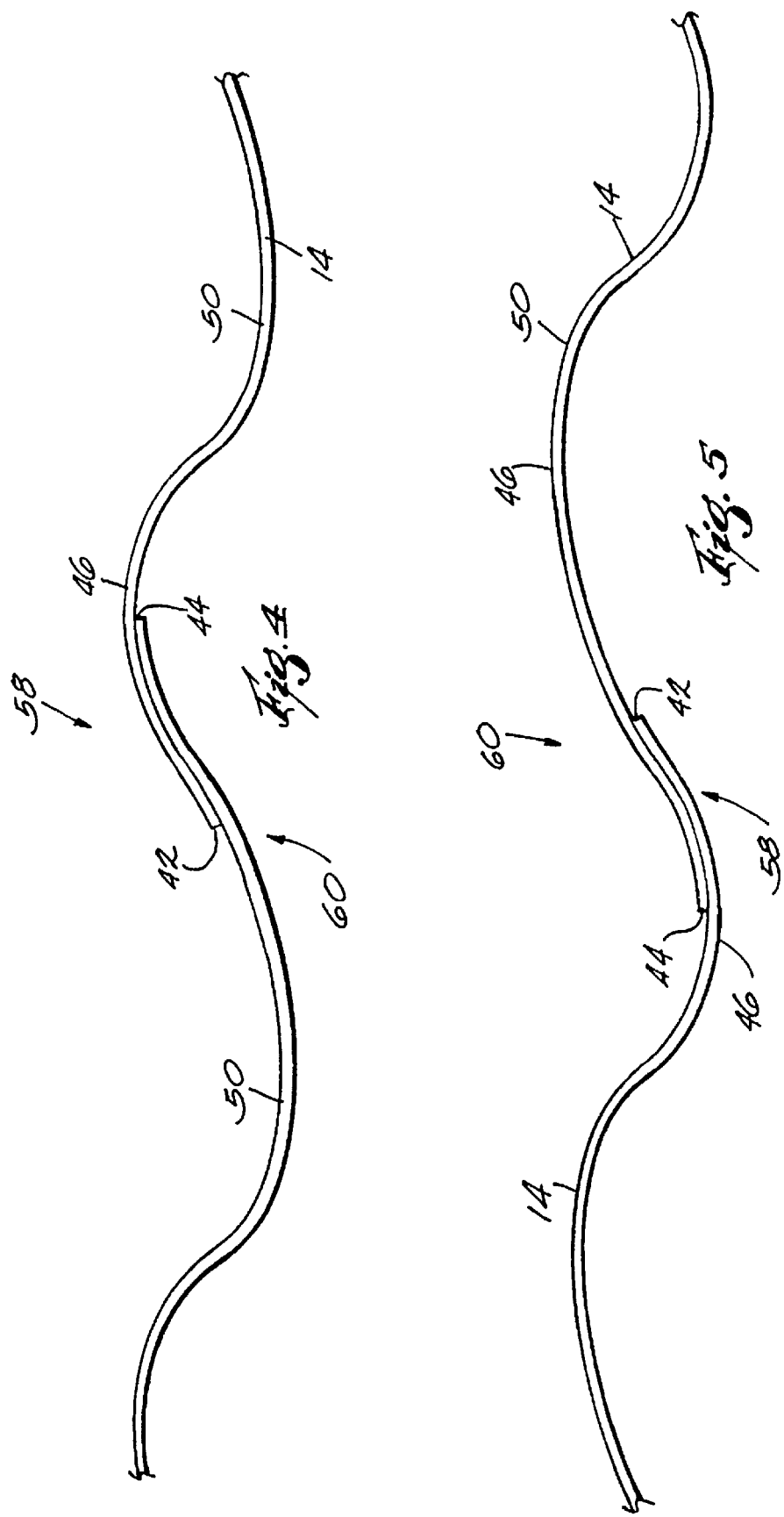

REVERSIBLE ROOFING PANEL AND METHOD FOR MAKING A ROOFING PANEL

This application claims the benefit of U.S. Provisional Application No. 60/038,515, filed Jan. 21, 1997.

BACKGROUND OF THE INVENTION

1. Technical Field

The invention relates generally to roofing assemblies, and more particularly to roofing assemblies including interconnected roofing panels. The invention also relates to materials of manufacturing such panels.

2. Related Prior Art

It is generally known to provide a roof by interconnecting a plurality of panels to form a substantially water-proof barrier. It is also known to fabricate such panels from a steel sheet that has been formed so as to provide various surfaces that can be engaged by complementary surfaces on a similar panel to enhance the integrity of the roof and to ease assembly of the panels into a roof. It is also generally known to treat the panels of a roofing system to provide an exterior having the appearance of a tile roof.

Examples of roofing assemblies including such panels are illustrated by the following prior art references:

| Pat. No. | Inventor | Issued |
| --- | --- | --- |
| 5,174,092 | Naden | 12/29/92 |
| 4,580,384 | Hutcheson | 04/08/86 |
| 4,577,444 | Sanderson | 03/25/86 |
| 4,567,084 | Jse | 01/28/86 |
| 4,099,359 | Sivachenko | 07/11/78 |
| 2,037,297 | Yeager | 01/03/31 |
| 1,657,271 | Nelson | 06/08/25 |
| 650,939 | Kasch | 06/05/00 |

SUMMARY OF THE INVENTION

One of the problems with roofing assemblies or systems including known panel configurations is that only one side of the panel can be used as the exposed or "top" side of the panel when the panel is made part of a roof. While there may be several reasons for this limitation depending upon the configuration of known panels, one common reason for this limitation is the provision of a rain channel which extends along one edge of each panel and which is designed to collect and direct water falling on the roof. This type of rain channel is often formed by overlapping or mating portions of adjacent panels that are effective in one orientation, i.e., "right side up", but impair the integrity of the roof if the panel is inverted or turned "up side down." More particularly, inverting known panels results in gaps between the interconnected panels, and an increased risk that the roof will leak.

The invention provides panels differing from the prior art panels. In particular, the new panels are uniformly or symmetrically curved along the lateral edges, i.e., the rain channel found in prior art designs is eliminated. This symmetrical configuration affords use of either opposite face of the panel as the "upper" or exposed side.

One advantage of this assembly is the elimination of inventory that must be carried to satisfy customer demand. For example, the opposite faces of a panel could be painted different colors. Such an approach affords use of the panels with a first side exposed to provide a roof of a first color, and the panels could be inverted and arranged to form a roof having the other color. Reductions in inventory are realized because two different colors or surface treatments can be applied to a single panel, thus eliminating the need for two sets of panels for two different roof styles.

Also, the new panel configuration facilitates assembly and installation of the roof, and provides light-weight panels of a size that makes the panels somewhat easier to handle.

In addition, the invention also provides a method of manufacturing a roofing panel utilizing infrared radiation ("IR"), or a combination of IR and convection heating, for curing an adhesive applied to the panel for the purpose of maintaining a particulate coating on the panel. The manufacturing process is highly efficient and produces a particulate coating that has a long service life. The efficiencies realized by the roofing panel manufacturing process achieves significant cost reductions. Power consumed in the curing step is less than that use for conventional convection curing. Also, the time required to fully process the panels is reduced, which entails a reduction of in-process inventory.

Other features and advantages of the invention will become apparent to those skilled in the art upon review of the following detailed description, claims and drawings.

DESCRIPTION OF THE DRAWINGS

FIG. 2 is a cross-sectional view taken along line 2—2 in FIG. 1.

FIG. 3 is a cross-sectional view taken along line 3—3 in FIG. 1.

FIG. 4 is a side view of the assembly shown in FIG. 1.

FIG. 5 is a view similar to FIG. 4 showing the assembly in an inverted position.

FIG. 7 is a schematic view of a facility for carrying out a method of manufacture embodying the invention.

Figure 1:
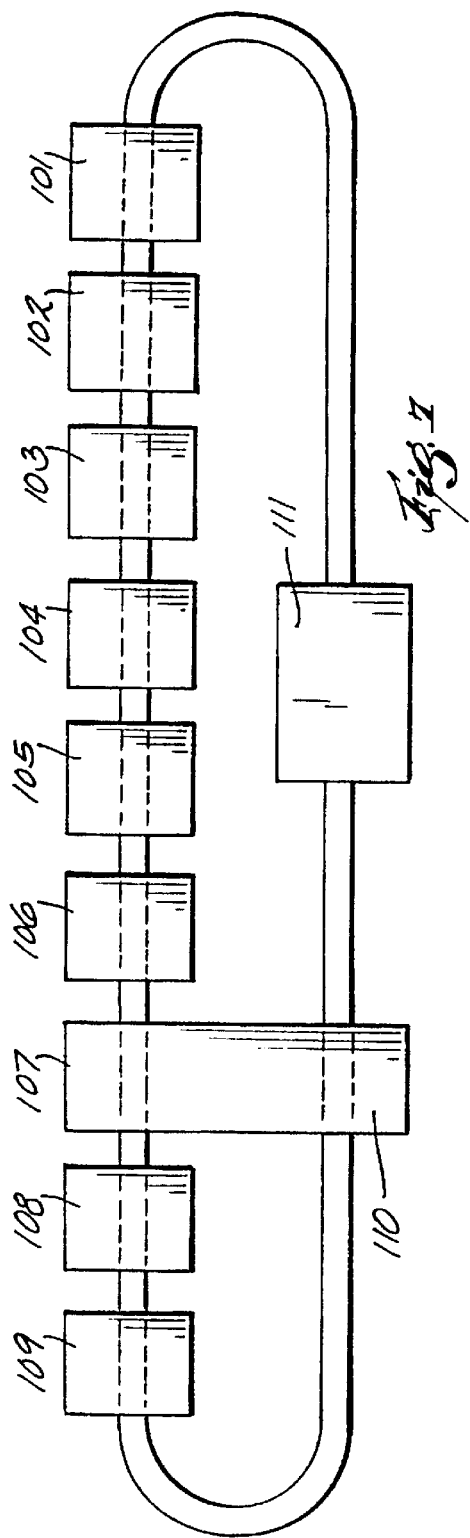
FIG. 1 is a perspective view of a roofing assembly embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The drawings illustrate a roofing assembly 10 including a plurality of interconnected, overlapping panels 14 for providing a roof having the appearance of a conventional tile roof. The assembly 10 is installed on a conventional inclined roofing support surface or sheath 18 and is fixed to the sheath 18 by a plurality of fasteners 22. Each of the panels 14 are identical, and only one such panel 14 will be described in detail.

The panel 14 includes a first, "exposed" surface 26, which is shown as being the upper surface in FIGS. 1–4 and is shown as the lower surface in FIG. 5. The panel 14 also includes a second, "unexposed" surface 30 which faces opposite the first surface 26 and which is shown as the lower surface in FIGS. 2–4 but which is the upper surface in FIG. 5. The panel 14 is preferably made of a thin sheet of material that can be formed by bending, such as sheet metal or a similar malleable material. Suitable materials for the panel 14 is galvanized (zinc coated) steel or galuvalum (aluminum/zinc coated) steel. The panel 14 could also be made of a light-weight, high-strength composite material such as a fiberglass reinforced resin.

The panel 14 has a generally rectangular periphery including a first edge 34, shown as the upper edge 34 in FIG. 1. The panel 14 also includes a second edge 38 which is shown as the lower edge 38 in FIG. 1 and which extends parallel to the upper edge 34. The panel 14 also a pair of parallel side edges 42 (the left edge in FIGS. 1 and 2) and 44 (the right edge in FIGS. 1 and 2) which are laterally space apart, which are perpendicular to the upper and lower edges 34, 38, are generally parallel and which extend between the upper and lower edges 34 and 38.

As shown in FIG. 2, when viewed in a cross section along a plane perpendicular to the side edges 42 and 44, the opposed faces 26, 30 extend between the side edges 42,44 of the panel 14 and define generally serpentine profile extending between the side edges 42 and 44. More particularly, the profile of the panel 14 provides an alternating series of semi-cylindrical or arcuate surfaces: convex peaks or barrels 46 and concave pans 50. For aesthetic reasons and, as explained below in greater detail, for superior integrity of the roof, the radii of curvature of the barrels 46 and pans 50 are neither constant nor equal. Rather, as best shown in FIG. 2, the radius of curvature of the barrels 46 is generally smaller than that of the pans 50.

As shown in FIG. 3, when viewed in a cross section along a plane extending perpendicular to the upper and lower edges 34 and 38, the exposed, upper face 26 of the panel 14 has a generally uniformly straight or linear cross-section that, in order to appear like a natural tile roof, is stepped. More particularly, the exposed surface 26 defines a series of steps or noses 54 facing toward the lower edge 38 and extending between the side edges 42 and 44.

Figure 6:
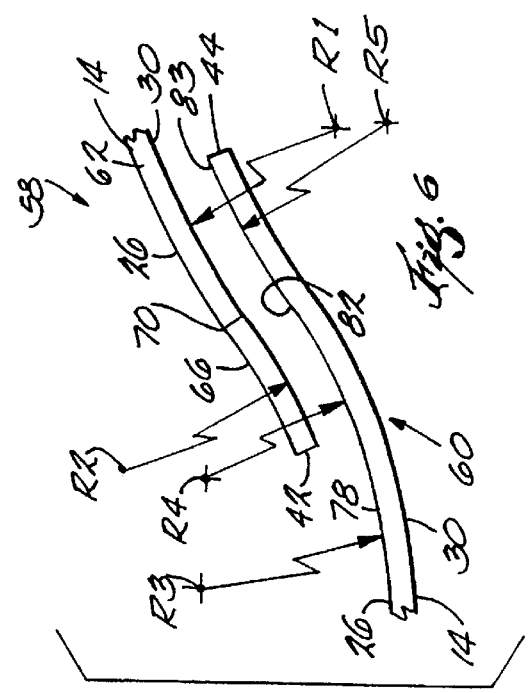
FIG. 6 is an enlarged, exploded view of the FIG. 4.

With particular reference to FIGS. 4 and 6, the faces 26 and 30 define side regions 58 and 60 of the panel that are located adjacent and that extend along respective side edges 42 and 44. The portions of the exposed and unexposed surfaces 26, 30 of the panel 14 which define the side region 58 are configured to respectively mate with the unexposed and exposed surfaces 30, 26 of the side region 60 provided by a second panel 14 partially overlaying the first panel 14. Specifically, each panel 14 has a side region 58 located along side edge 42 defining a barrel 46 and a side region 60 located along the side edge 44 defining a pan 50. When, as shown in FIGS. 4 and 6, the side portion 58 of a first panel 14 is positioned in overlying relation to the opposite side region 60 of a second panel 14, in general, the unexposed surface 30 of the barrel 46 of the side region 58 of the first panel 14 mates with the exposed surface 26 of the pan 50 of the side region 60 of the second panel 14.

In order to provide a superior seal between the side regions 58 and 60 of the overlapped panels 14, and to provide the assembly 10 with reversible roofing panels, the exposed and unexposed surfaces 26 and 30 of the side regions 58 and 60 of the panels 14 have (FIG. 6) slightly discontinuous radii of curvature. More particularly, the side region 58 of panel 14 defining a barrel 46, e.g., the upper panel 14 in FIG. 6, has a semi-cylindrical or arcuate mating surface or portion 62 which is spaced laterally inwardly of the side edge 42 and which has a radius of curvature R1 such that the exposed surface 26 is convex. However, the side region 58 also provides a semi-cylindrical or arcuate mating surface or portion 66 which is located immediately adjacent the side edge 42 and between the side edge 42 and first portion 62. The second portion 66 of the side region 58 has a radius of curvature R2 centered on the side of the panel 14 opposite the radius of curvature R1 of the first portion 62 such that the exposed surface 26 of the panel 14 provided by the second portion 66 is slightly concave. A point of inflection 70 delineates the boundary between the first and second portions 62 and 66 of the side region 58.

Similarly, the side region 60 of the panel 14 defining a pan 50, e.g., the side region 60 of the lower panel 14 in FIG. 6, has a first portion 78 which is spaced laterally inwardly of the side edge 44 and which has a radius of curvature R3 such that the exposed surface 26 is concave. However, the side region 60 defining a pan 50 also provides a semi-cylindrical or arcuate mating surface or portion 82 which is located between the first portion 78 and the side edge 44, and which is overlapped by the portion 66 of the upper panel 14. The second portion 82 of the side region 60 provides a semi-cylindrical or arcuate mating surface having a radius of curvature R4 centered on the same side of the panel 14 as the radius of curvature R3 of the first portion 78 such that the exposed surface 26 of the panel 14 provided by the second portion 66 is also concave. However, the radius of curvature R4 is substantially equal to the radius of curvature R2 of the semi-cylindrical or arcuate mating surface provided by portion 66 of side region 58 such that the exposed surface 26 defined by the portion 82 mates with the unexposed surface 30 of the portion 66 above portion 82.

The side region 60 also includes a third portion 83 that is located immediately adjacent the side edge 44, i.e., between the second portion 82 and the side edge 44, and that has a radius of curvature R5 that is centered on the side of the panel 14 opposite the radius of curvature R3, i.e., the exposed surface 26 of the third portion 83 is convex. The third portion 83 thus also provides a semi-cylindrical or arcuate mating surface which engages the unexposed surface 30 of side region 58 in the manner discussed below. In particular, the radius of curvature R5 is equal to the radius of curvature R1 of portion 62 of side region 58 so as to provide complementary, cylindrical mating surfaces.

The provision of complementary, mating side regions 58 and 60 affords the assembly 10 the capacity to sealingly interconnect the panels 14 in a manner providing a first exposed surface, e.g., such that surface 26 faces upwardly as in FIG. 4, and in an inverted position such that an opposite, second surface is exposed, e.g., as shown in FIG. 5 such that surface 30 faces upwardly and surface 26 faces the sheath 18 (not shown in FIG. 5). The mating side regions 58 and 60 are configured so that the overlapped side regions 58 and 60 sealingly engage or mate to provide a joint between the upper and lower panels 14 that does not permit the passage of water therethrough without regard to the which side of the panel 14 is exposed. In either case, the side region of the upper panel overlaps the side region of the lower panel, and the lower panel is oriented to channel water away from the joint. Also, there is no gap in the joint between the mating side regions because of the inflection in the radii of curvature of the side region 58 and the complementary curvatures of the side region 60.

FIG. 7 schematically illustrates a manufacturing family or manufacturing method for roofing process or other sheets of material to which a coating is applied. The specific configuration of the panel treated by the process is not limited to the configuration of panel 14 described above. Indeed, any metallic or resin-based sheet can be coated using the process. However, for the purpose of illustration, the method will be described using panel 14 as a reference.

More particularly, the facility and coating process is used to apply a particulate coating, such as a coating of crushed stone 85 (see FIG. 2), to the faces 26, 30 of a panel 14. The following steps comprise the manufacturing process for applying the coating to the faces 26, 30. In general, the steps include preparing the panel for application of an adhesive to the faces of the panel, the application of an adhesive, the application of a coating to the panel, and then curing the adhesive to bond the coating to the panel. These steps are more particularly described in combination with the facilities for carrying out the method.

Station 101—Loading Area: This is where the preparation of the panels 14 begins by placing the panels on conveyor line (not shown) that travels at an adjustable rate of speed of 12 to 22 feet per minute.

Station 102—Wash Booth: The panels 14 are prepared for the application of an adhesive by cleaning the panels with a high pressure spray of water to eliminate any residues, such as lubricants used in the process of forming the panels.

Station 103—Dry Booth: The panels are then sprayed with a high pressure air spray to remove all water that may be on the panels 14 after the washing step and that may dilute or interfere with the coating process.

Station 104—Adhesive Booth: A coating of adhesive is sprayed on the side of the panels 14 to be coated. As explained below, the type of adhesive to be used must be amenable to curing by application of either infrared radiation alone or in combination with convection curing techniques. The preferred adhesive is sold under the name Aqua-Mastic IR AP Series adhesive, and is applied at a standard and average thickness of 7 to 11 mills of wet film thickness preferably about 0.010 inch.

Station 105—Stone Booth: The adhesive coated panels are then passed under a shower of particulate that will adhere to the adhesive. For example, the particulate shower may be of a fine colored quartz stone that is applied by a continuous falling curtain through which the conveyor carries the panels. A suitable coating material is Estes Medium/Fine Broadcast Quartz Stone that is deposited on the panels 14 by a controlled recycling vacuum or conveyor assembly (not shown). This curtain system is fed by a main stone hopper (not shown).

Station 106—Air Knife: The stone coated panels then pass through a high pressure stream of air to remove excess particulate matter. The high pressure air also acts on the panels to embed the particulate into the adhesive. Further, preferably Station 106 includes a collector into which residue stone falls, is reclaimed and circulated back to the main hopper to be part of the continuous curtain at Station 105.

Station 107—IR Curing Oven/Phase 1: The panels then for the first time pass through an infrared or IR—Convection Combination oven for dual side curing at an average temperature range of 165 to 210 degrees. The oven preferably has a series of heat bank zones to provide a sequence of radiation curves that cure the panels from the inside out by allowing the moisture to escape from the adhesive and stone coating before the adhesive material skins over. A suitable oven is made by BGK and or INFRA-Tech having a power rating of 150 to 300 KW operated at 35%–75% of full power. The panels travel through the oven at this step of manufacturing for approximately 2 to 4 minutes.

Station 108—Flash Booth: At this point, if desired, an accent color of the base adhesive material is applied to the face of the panels 14 in a random pattern to give the effect of a flashed or burnt marking. This is purely an aesthetic process.

Station 109—Over Glaze Booth: The panel 14 is completely covered with a generous coating of the Aqua-Glaze IR material at a standard and average thickness of 0.002 inch. This process aids in the overall protection of the coating materials through shipping and handling and allows for resistance to ultraviolet fading or degradation as well as to fungus growth.

Station 110—IR Curing Oven/Phase 2: The panel 14 then returns through the infrared or IR/Convection Combination oven past a series of IR heat bank zones to permit the product to fully cure the protective overglaze coating.

Station 111—Off Loading and Packaging: The panel 14 is removed from the conveyor and pelletized for shipment.

There are three (3) fan stations (not shown) located after stations 106, 107 and 110. These banks of standard 24" fans are placed in a horizontal position on the floor facing upward creating a finning effect to allow the applied materials to flash off and cool when needed.

Thus, the panels 14 can be coated with a particulate material by the method having the following steps: (a) preparing a panel for coating; (b) applying a coating to the panel; and (c) providing a source of infrared radiation and subjecting the panel to infrared radiation to cure the adhesive.

As explained above, the preparation step (a) can include various conveying, cleaning, washing, and drying steps. Also, the application step (b) can include various steps of applying adhesive, applying particulate material, and removing excessive material. Similarly, the curing step (c) can include various methods of applying infrared radiation to the panels for curing the adhesive and bonding the particulate to the panels. Also, finishing, glazing, and final curing steps are contemplated.

Other features and advantages of the invention are set forth in the following claims.

What is claimed is:

1. A roofing assembly adapted to be fixed to a support sheath, said assembly comprising:

a first panel and a second panel, the first and second panels each including first and second edges and first and second side edges, a first surface extending between the first and second edges and between the first and second side edges, and a second surface facing opposite the first surface, the first and second surfaces defining an alternating series of barrels and pans, a first side region extending along the first side edge, and a second side region extending along the second side edge, the first and second panels being arranged in partially overlapping relation so that one of the first surface and the second surface of each of the first and second panels provides an exposed surface facing away from the sheath, the first and second side regions of the first and second panels each including a portion of the exposed surface, the first and second side regions of the first and second panels each including a portion of an unexposed surface, the portion of the unexposed surface defined by the first side region of the first panel being configured to mate with the portion of the exposed surface defined by the second side region of the second panel, wherein the first side region of both the first panel and the second panel includes a first portion having a first radius of curvature centered on a same side of both the first panel and the second panel as the unexposed surface and a second portion located between the first portion of the first side region and the first side edge, and having a second radius of curvature centered on a same side of both the first panel and the second panel as the exposed surface, and wherein the second side region of both the first panel and the second panel includes a first portion having a third radius of curvature centered on the same side of both the first panel and the second panel as the exposed surface, a second portion located between the first portion of the second side region and the second side edge, and having a fourth radius of curvature that is equal to the second radius of curvature, and that is centered on the same side of both the first panel and the second panel as the exposed surface and a third portion located between the second portion of the second side region and the second side edge and having a fifth radius of curvatrue that is equal to the first radius of curvature, and that is centered on the same side of both the first panel and the second panel as the unexposed surface.

2. The roofing assembly of claim 1, wherein the first side region of the first and second panels is a barrel and the second side region of the first and second panels is a pan.

3. The roofing assembly of claim 1, wherein a mating between the portion of the unexposed surface defined by the first side region of the first panel and the portion of the exposed surface defined by the second side region of the second panel creates a substantially water-tight seal.

4. The roofing assembly of claim 3, wherein the water-tight seal is created both when the first surface of the first panel and the first surface of the second panel are the exposed surfaces, and,when the second surface of the first panel and the second surface of the second panel are the exposed surfaces.

5. A method for manufacturing a panel having a coating, the method comprising the steps of:
    (a) preparing a panel for coating;
    (b) applying a coating to the panel; and
    (c) providing a source of infrared radiation and subjecting the panel to infrared radiation to cure the coating.

6. The method of claim 5 wherein the preparation step (a) further includes the steps of providing a traveling conveyor and attaching a panel to a conveyor line traveling at a selected travel speed.

7. The method of claim 5 wherein the preparation step (a) further includes the steps of cleaning the panel and drying the panel.

8. The method of claim 5 wherein the application step (b) includes the step of applying an adhesive to a face of the panel and the step of applying a coating of crushed particulate material to the panel.

9. The method of claim 8 wherein the application step (b) further includes the step of removing excess particulate material from the panel after the adhesive and particulate material are applied to the panel.

10. The method of claim 5 and further including the step (d) of applying a glazing material to the panel to create an overglazing layer and the step of curing the glazing material.

11. The method of claim 5 wherein step (a) further comprises selecting a traveling speed of between about 12 feet per minute and about 22 feet per minute.

12. The method of claim 11 wherein step (a) further comprises spraying the panel with a high pressure spray of water.

13. The method of claim 12 wherein step (a) further comprises spraying the panel with a high pressure air spray.

14. The method of claim 5 wherein step (b) further comprises spraying an adhesive onto both a first side and a second side of the panel to a standard and average thickness of between about 0.07 inches to about 0.11 inches.

15. The method of claim 14 wherein step (b) includes the step of providing an oven of a type selected from the group consisting of an infrared oven and an infrared/convection oven, and passing the panel through the oven for dual side curing.

16. The method of claim 15 wherein step (b) includes selecting an average temperature range for the oven of between about 165 to about 210 degrees Fahrenheit and subjecting the panel to the oven for between about 2 to about 4 minutes.

17. The method of claim 16 and further comprising the step (d) of applying an accent color to the panel in a random pattern.

18. The method of claim 17 wherein the step (d) includes the step of completely covering the panel with a glaze material at a standard and average thickness of about 0.002 inch.

19. The method of claim 18 wherein step (d) further comprises passing the panel past a series of, infrared heat bank zones to fully cure the glaze material.

20. A roofing panel comprising:
    a sheet having an upper surface, a first edge, a second edge opposite said first edge, a first edge region adjacent to said first edge, and a second edge region adjacent to said second edge,
    wherein said first edge region forms a portion of a barrel having a first concave portion adjacent to said first edge and a first convex portion adjacent to said first concave portion, where concave and convex are in reference to said upper surface, and
    wherein said second edge region forms a portion of a pan having a second convex portion adjacent to said second edge and a second concave portion adjacent to said second convex portion, where concave and convex are in reference to said upper surface.

21. The roofing panel of claim 20, wherein said first concave portion has a radius of curvature (R1), and said second concave portion has a radius of curvature (R4), and wherein (R2) is substantially equal to (R4).

22. The roofing panel of claim 21, wherein said first convex portion has a radius of curvature (R1), and said second convex portion has a radius of curvature (R5), and wherein (R1) is substantially equal to (R5).

23. The roofing panel of claim 20 having a series of barrels and pans formed in said upper surface.

24. The roofing panel of claim 23 wherein each said barrel is a convex portion with reference to said upper surface and each said pan is a concave portion with reference to said upper surface, and wherein a radius of curvature of each said barrel is smaller than a radius of curvature of each said pan.

25. The roofing panel of claim 20 wherein said sheet is formed of a rigid malleable material.

26. The roofing panel of claim 25 wherein said sheet is formed of a material selected from the group consisting of sheet metal, galvanized steel, galuvalum steel, and fiberglass reinforced resin.

27. The roofing panel of claim 20 further comprising a coating of crushed stone on said upper surface.

28. The roofing panel of claim 27 further comprising a lower surface opposite said upper surface, said lower surface having a coating of crushed stone.

* * * * *